(12) United States Patent
Olivieri et al.

(10) Patent No.: US 11,806,943 B2
(45) Date of Patent: Nov. 7, 2023

(54) APPARATUS AND METHOD FOR FORMING A FRONT TOOTHING ON AN INNER RING OF A WHEEL HUB AND ASSOCIATED FRONT TOOTHING

(71) Applicant: AKTIEBOLAGET SKF, Gothenburg (SE)

(72) Inventors: Davide Antonio Olivieri, Turin (IT); Laura Sguotti, Bricherasio (IT); Fulvio Carlo Nicastri, Garzigliana (IT); Enrico Luigi Morello, Roletto Turin (IT); Luca Biancone, Turin (IT)

(73) Assignee: AKTIEBOLAGET SKF

( * ) Notice: Subject to any disclaimer, the term of this patent is extended or adjusted under 35 U.S.C. 154(b) by 106 days.

(21) Appl. No.: 17/495,954

(22) Filed: Oct. 7, 2021

(65) Prior Publication Data

US 2022/0111603 A1    Apr. 14, 2022

(30) Foreign Application Priority Data

Oct. 14, 2020    (IT) ...................... 102020000024166

(51) Int. Cl.
*B21D 53/10*    (2006.01)
*B29C 67/00*    (2017.01)
*B29L 31/04*    (2006.01)

(52) U.S. Cl.
CPC ....... *B29C 67/0029* (2013.01); *B29L 2031/04* (2013.01)

(58) Field of Classification Search
CPC ..................... B29C 67/0029; B29L 2031/04
See application file for complete search history.

(56) References Cited

U.S. PATENT DOCUMENTS

| 4,893,960 A | 1/1990 | Beier et al. |
| 9,132,469 B2 * | 9/2015 | Bosco .................. B21J 5/12 |
| 2013/0181375 A1 | 7/2013 | Ferrero et al. |
| 2018/0043417 A1 | 2/2018 | Hagiwara |
| 2018/0202495 A1 * | 7/2018 | Hagiwara .............. F16C 43/08 |

FOREIGN PATENT DOCUMENTS

EP    2551034    1/2013

OTHER PUBLICATIONS

Search Report for corresponding Italian Patent Application No. 1202000024166 dated Aug. 13, 2021.

* cited by examiner

*Primary Examiner* — Alison L Hindenlang
*Assistant Examiner* — Debjani Roy
(74) *Attorney, Agent, or Firm* — Reed Smith LLP

(57) ABSTRACT

An apparatus including a plurality of first and second pressing elements arranged in crown symmetrically around an axis of symmetry (B) so that a first end of a first pressing element cooperates in contact with a second end of a second pressing element; wherein the first and second pressing elements are supported slidingly and passing through by, respectively, a first and a second plate coupled and bound to each other, in respective second and first slits angularly spaced apart; the first pressing elements being provided with hammerheads circumferentially wider than the second slits and which cooperate circumferentially without play in contact with each other, and the second pressing elements being provided with engraving heads circumferentially wider than the first slits, which cooperate circumferentially without play in contact with each other.

10 Claims, 5 Drawing Sheets

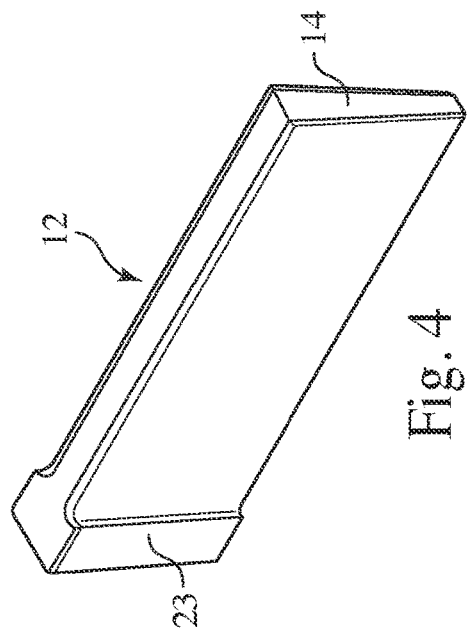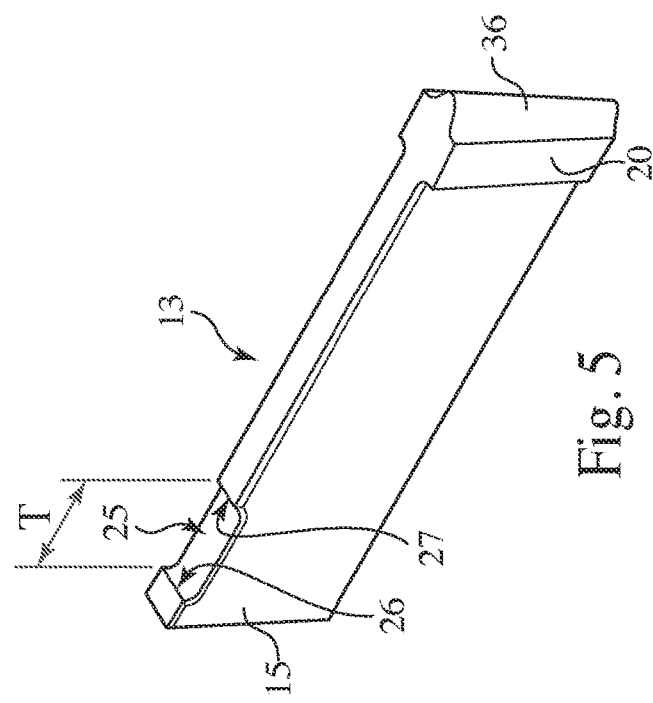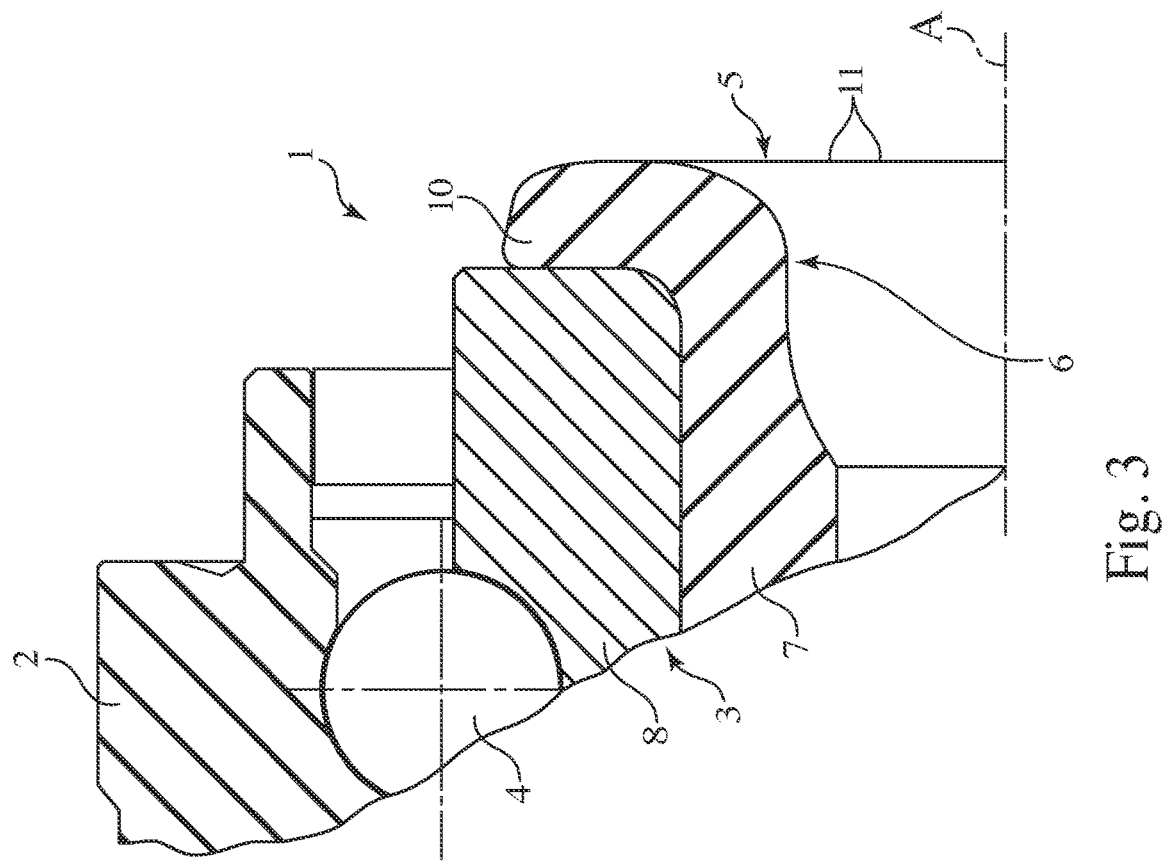

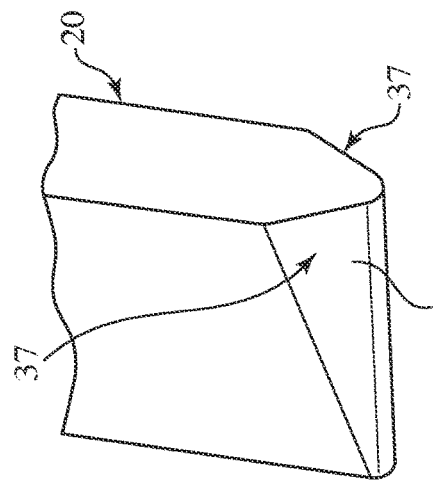
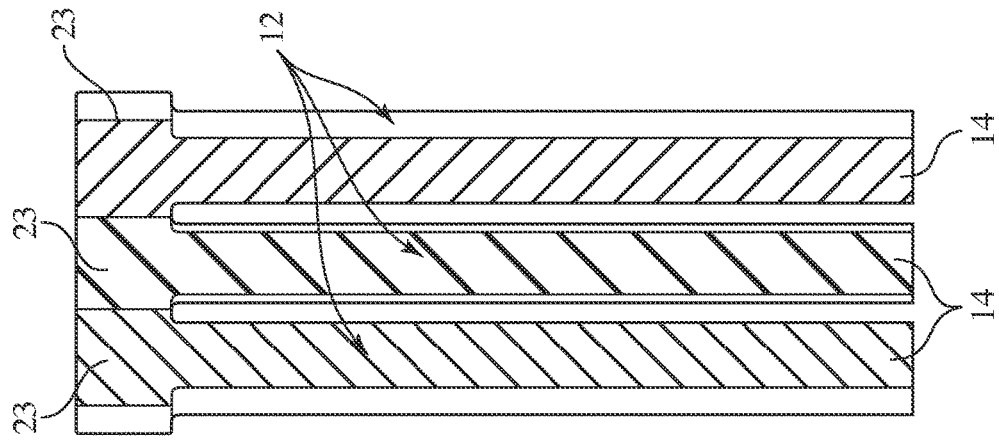
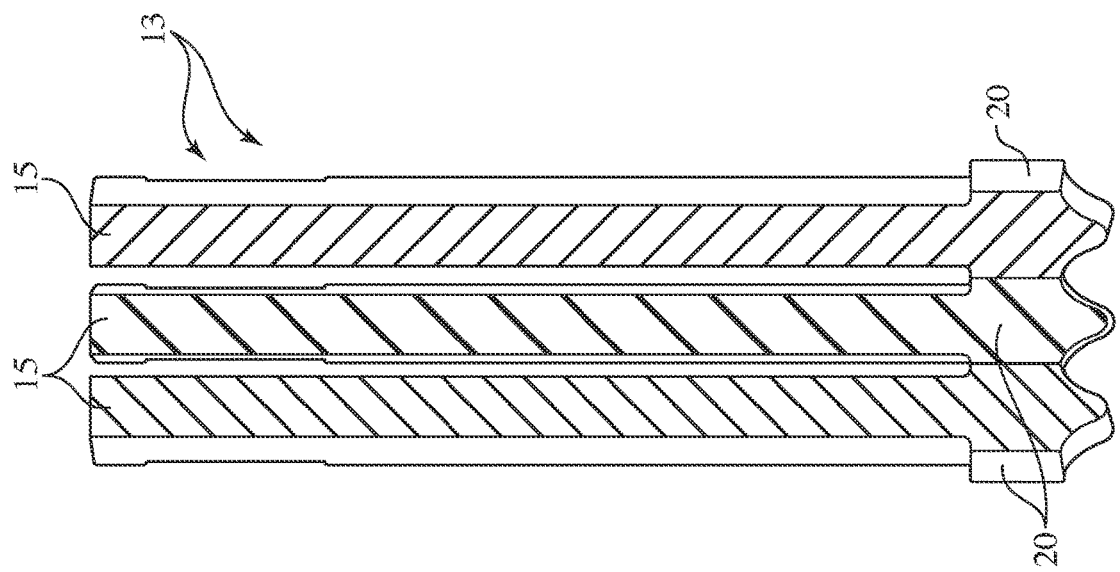

APPARATUS AND METHOD FOR FORMING A FRONT TOOTHING ON AN INNER RING OF A WHEEL HUB AND ASSOCIATED FRONT TOOTHING

CROSS-REFERENCE RELATED APPLICATION

This application is based on and claims priority to Italian Patent Application No. 102020000024166 filed on Oct. 14, 2020, under 35 U.S.C. § 119, the disclosure of which is incorporated by reference herein.

FIELD

The present application relates to innovative equipment and to an associated method for forming by plastic deformation a front toothing on an inner ring of a wheel hub.

In particular, the present application applies to a wheel hub the inner ring of which comprises a spindle, provided with a first raceway for a first row of rolling elements, and an added ring, provided with a second raceway for a second row of rolling elements, in which the added ring is locked axially on the spindle by means of an upset collar, defined by an end segment of the spindle which has been deformed plastically.

BACKGROUND

In wheel hubs of the above type, said front toothing has the function of head to head coupling of the inner ring of the wheel hub to a corresponding front toothing of an outer ring of a constant-velocity joint, so as to ensure the transmission of torque from the constant-velocity joint to the inner ring of the wheel hub, which carries a wheel of the vehicle via a flanged end. A coupling of this type is described in U.S. Pat. No. 4,893,960, which also teaches how to produce the front toothing on the inner ring of the wheel hub.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 3 schematically shows, on a further enlarged scale, for greater clarity, a view in radial section of part of a wheel hub equipped with a front toothing that can be obtained by means of the equipment of FIG. 1;

FIGS. 4 and 5 schematically show, on an even further enlarged scale, a three-quarters perspective side view of a first and second pressing element or knife, respectively, of the equipment of FIG. 1;

FIGS. 6 and 7 schematically show, on an even further enlarged scale, a view in elevation and in partial section of a series of the second pressing elements or knives and a series of the first pressing elements or knives of FIGS. 5 and 4, respectively;

FIG. 8 schematically shows a perspective view of a detail of one of the pressing elements or knives of FIGS. 5 and 6;

DETAILED DESCRIPTION

Figure 1:
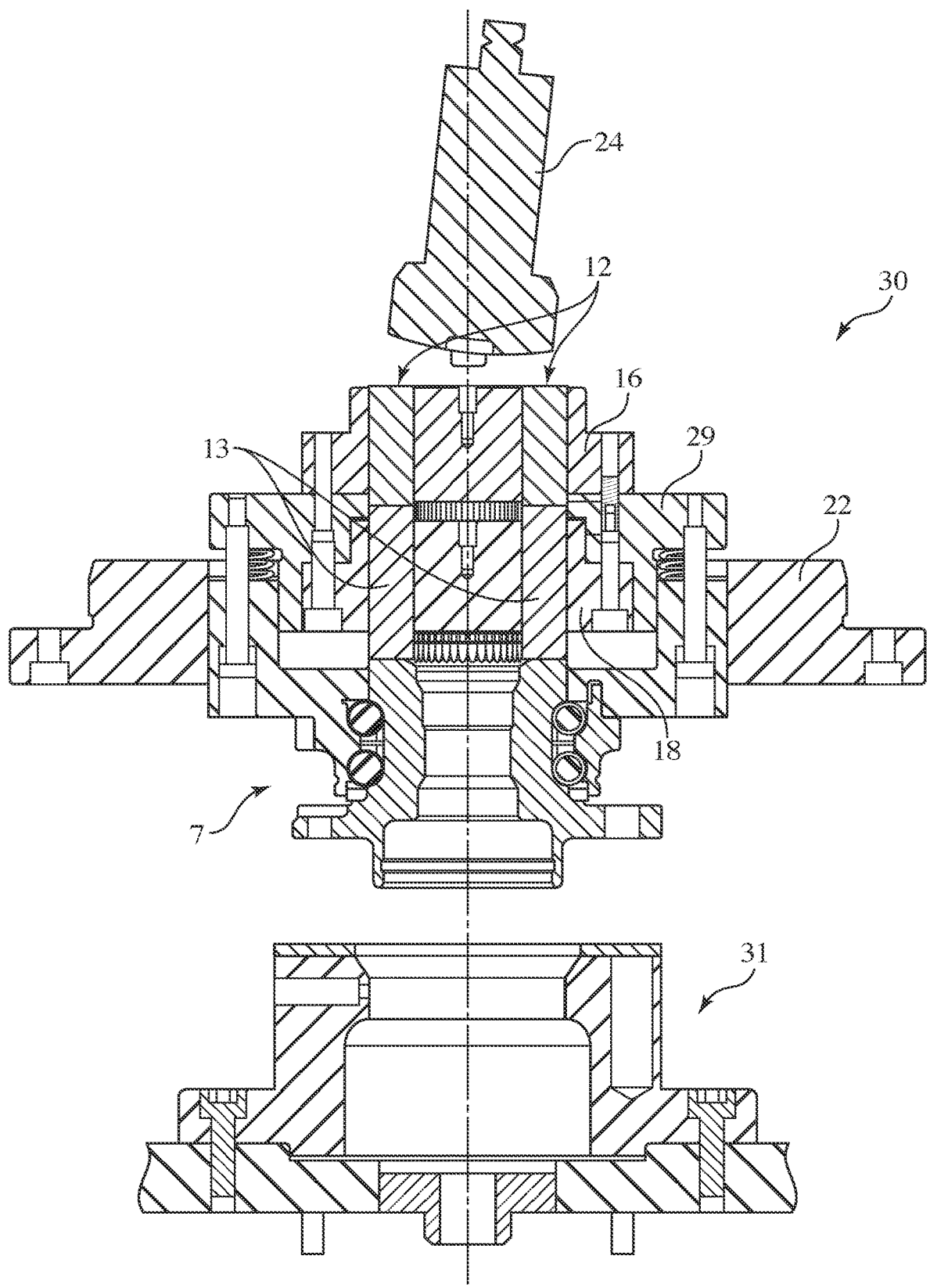
FIG. 1 schematically shows a view in elevation and in radial section of equipment produced according to the invention and capable of producing, by plastic deformation, a front toothing on an inner ring of a wheel hub.

According to U.S. Pat. No. 4,893,960, front toothing is obtained at the same time as an upset collar is formed, by means of a tool including a frustoconical element which produces the collar by upset forging and by means of a frontally toothed tubular element, mounted axially slidingly on the outside of the frustoconical element, which impresses the desired toothing on the collar in the deformation phase.

A forming method like that described above requires the use of a relatively complex tool and, above all, does not make it possible to obtain toothings with a highly constant tooth profile.

This problem is not fully solved by EP2551034B1, in which the toothing is formed by means of a plurality of sliding knives arranged in crown on a support, angularly spaced apart so as to allow mounting thereof.

The teeth are not always formed properly, in particular as regards the shape of the tips or crests of the teeth.

As a result, firstly, it is not always possible to provide the increasingly high torques necessary in modern vehicles to be transmitted and, secondly, during assembly between the wheel hub and a constant-velocity joint there may be incorrect tooth/tooth mounting, which means that the teeth of the two components do not intermesh correctly during coupling. When, in use, the teeth eventually snap into the correct position owing to the torque exerted, the central nut or screw used to lock the two components together immediately loses the clamping force imparted during assembly and a slight frontal play may also be created between the two coupled toothings of the wheel hub and constant-velocity joint, something which does not diminish the transmission of torque, but gives rise to noise on the axle owing to the fact that the teeth jump out of the correct position of engagement every time higher torques are transmitted.

Lastly, in a vehicle subjected to these conditions, the teeth can gradually be ground down, resulting in total loss of traction in 2WD vehicles (two-wheel drive) or just partial loss in 4WD vehicles (four wheel drive, not always engaged).

In both cases, this issue can in the long term gradually destroy a gearbox, if the driver does not notice the loss of power on an axle, since the vehicle CPU will not detect anomalies soon enough, as the axle without traction still sends a plausible ABS signal.

Referring to FIG. 3, the reference sign 1 generally designates a wheel hub comprising an outer ring 2 which is intended in use to be connected to a suspension upright (not shown) of a vehicle, and an inner ring 3, between which are arranged two rows of rolling elements 4, only one of which is shown in FIG. 3.

The inner ring 3 can be operationally associated, in use, with a constant-velocity joint, by means of a front toothing 5 obtained on a first end 6 thereof and is provided with a flange (not shown), for attaching a wheel of a vehicle at the opposite end to the end 6.

In the non-limiting example shown, the inner ring 3 comprises a spindle 7 defining the end 6, and a small ring 8 pressed against the end 6, which faces, in use, said constant-velocity joint; the inner ring 3, spindle 7 and small ring 8 are mutually coaxial, having a shared axis of symmetry A which coincides with a general axis of symmetry of the entire wheel hub 1.

The inner ring 3 is provided with an upset collar 10, which is obtained by orbital forming, by plastic deformation of the terminal end 6. In the non-limiting embodiment shown, the small ring 8 is axially locked on the spindle 7 by means of the upset collar 10, which projects axially with respect to the ring 8.

The collar 10 carries the front toothing 5, which is made on a front terminal face thereof which is arranged substantially perpendicular to the axis of symmetry A and which comprises a plurality of teeth 11.

With reference also to FIGS. 1, 2 and 4 to 7, the front toothing 5 is obtained by means of apparatus or equipment 30 for orbital forming by plastic deformation (FIG. 1) similar to that normally used for the orbital forming of the collar 10 on the inner ring 3 of a wheel hub 1.

The equipment 30 comprises a substantially rigid plate support 22 (FIGS. 1 and 2), having an axis of symmetry B coinciding in use with the axis A (FIG. 1) of the wheel hub 1, and a base 31 to support the wheel hub 1 coaxial with the axis of symmetry B of the plate support 22.

The plate support 22 and the base 31 are axially mobile relative to one another (for example, one is fixed and the other moves, or vice versa), parallel to the axis B (and hence also to the axis A), in such a way that the plate support 22 can cooperate in use, frontally, with the annular collar 10.

The wheel hub 1 is, in use, inserted between the plate support 22 and the base 31, bound angularly and axially to the latter, with the toothing 5 yet to be formed, but with the collar 10 already formed, for example by means of orbital forming carried out using known equipment.

Once the semi-finished product consisting of the wheel hub 1 without the front toothing 5 but with the upset collar 10 is in position on the base 31, the plate support 22 and the base 31 are moved towards one another in a known manner (for example, the plate support 22 is moved towards the base 31, which remains fixed, or vice versa), so as to bring the plate support 22 close to the collar 10, and the front toothing 5 is formed as will be seen below.

According to one aspect of the application, the equipment 30 comprises, in addition to the plate support 22 and the base 31, a plurality of first pressing elements 12 and an equal number of second pressing elements 13.

The pressing elements 12 and 13 are blade-shaped and are arranged in crown symmetrically around the axis of symmetry B of the plate support 22, oriented radially and arranged head to head the first on the second, in two concentric axially overlapping crowns carried by the plate support 22 as will be seen below.

Figure 2:
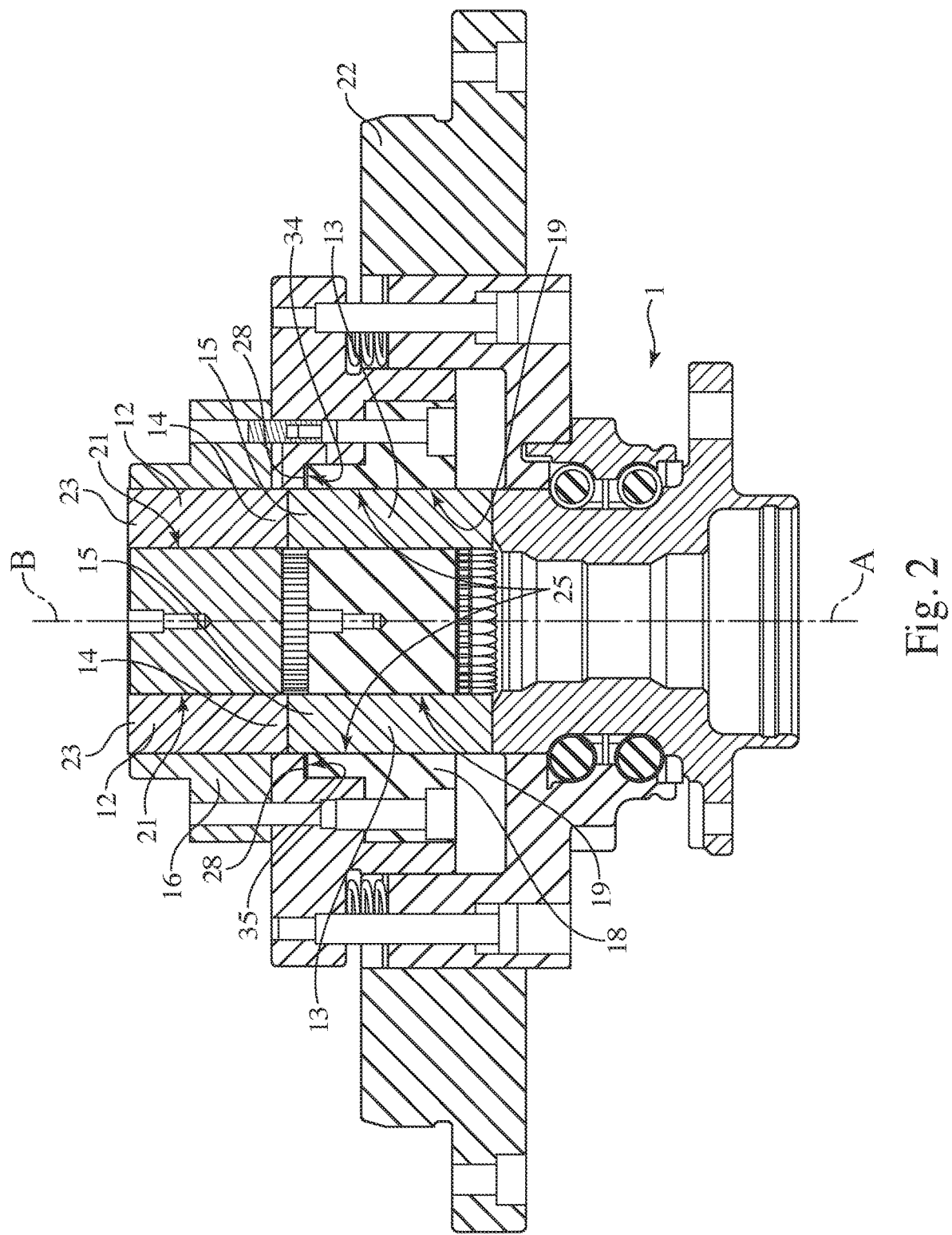
FIG. 2 schematically shows, on an enlarged scale, a detail of the main components of the equipment of FIG. 1.

In particular, a first end 14 of each first pressing element 12 facing towards the base 31 cooperates frontally in contact with a second end 15 of a corresponding second pressing element 13 facing opposite the base 31 (FIG. 2).

The equipment 30 further comprises a first plate 16, which supports axially passing through and axially slidingly the first pressing elements 12 and a second plate 18 coupled frontally to the first plate 16 on the side of the base 31 and axially bound to the plate 16.

The second plate 18 supports axially passing through and axially slidingly the second pressing elements 13, is arranged on the side of the base 31 and is supported by the plate support 22 together with the first plate 16 an any appropriate manner.

According to a first important aspect of the invention, the second pressing elements 13 are slidingly housed substantially without play in respective first axial slits 19 obtained radially in crown through the second plate 18, circumferentially spaced between each other, and are each provided, on the side opposite to the second ends 15 and towards the base 31, with an engraving head 20 circumferentially wider than the first slits 19, configured so that the engraving heads 20 of the second pressing elements 13 cooperate circumferentially with each other substantially without circumferential play and, therefore, in direct contact with each other and in a sliding way, while, over the rest of their axial extension, the pressing elements 13 are not in circumferential contact with each other, being "sheathed" in the slits 19.

Obviously, to enable a similar configuration, the engraving heads 20 project axially from the plate 18 and outside the slits 19, on the side of the base 31 (FIG. 2).

According to another important aspect of the application, and in combination with what has been described above, the first pressing elements 12 are slidingly housed in respective second axial slits 21 (FIG. 2) obtained radially in crown through the first plate 16, circumferentially spaced between each other, and are each provided, on the side opposite to the first end 14, with a hammerhead 23 circumferentially wider than the second slits 21, configured so that the hammerheads 23 of the first pressing elements 12 cooperate circumferentially with each other substantially without circumferential play and, therefore, in direct contact with each other and in a sliding way, while, over the rest of their axial extension, the pressing elements 12 are not in circumferential contact with each other, being "sheathed" in the slits 21.

Obviously, to enable a similar configuration, the hammerheads 23 project axially from the plate 16 and outside the slits 21, on the side opposite the base 31 and the ends 14 and 15 (FIG. 2).

The equipment 30 further comprises a rotating in orbital motion pressure head 24.

The hammerheads 23 are configured to cooperate in use with the pressure head 24 to push one at a time the first pressing elements 12 against the second pressing elements 13 with a sequential axial movement and push accordingly, selectively and with a corresponding sequential axial movement, each second pressing element 13 towards the base 31 and, in use, against the collar 10 to engrave on the collar 10, by controlled plastic deformation, the desired front toothing 5.

According to a further aspect of the application, the second end 15 of the second pressing elements 13 are provided radially on the outside with respective radial indentations 25 (FIG. 5) that extend axially for a prefixed length T delimiting on each second pressing element 13 a first shouldering face 26 and a second shouldering face 27 (FIG. 5), which are opposite and facing each other.

To connect the pressing elements 13 to the plate 18 in a way such that the elements 13 cannot "fall" from the plate 18 by gravity when they are not pressed against the collar 10, the equipment 30 further comprises a plurality of end-stoke elements 28 (FIG. 2) configured to engage said indentations 25 and cooperate with the first and second shouldering face 26, 27 of each indentation 25 to limit the axial movement of each second pressing element 13 to said fixed length T.

In particular, the equipment 30 comprises a third plate 29 (FIGS. 1 and 2) arranged radially on the outside of the second plate 18.

A first annular end 34 of the third plate 29 is placed immediately adjacent to the first plate 16 and axially overhanging with respect to the second plate 18 so as to form between the first and the second plate 16, 18 an annular seat 35 (FIG. 2) arranged in correspondence with the second ends 15 of the second pressing elements 13.

These second ends 15 are configured so as to protrude at least in part axially overhanging with respect to the first slits 19, on the side of the first plate 16.

The third plate 29 is arranged axially tight packed between the first plate 16 and the second plate 18 so as to form, with its annular end 34, which is L-shaped in radial section, and together with the plate 18, the annular seat 35.

The annular seat 35 houses at least a pair of semi-rings 28 (or a plurality of ring segments 28) configured to protrude radially overhanging from the second plate 18 and towards the second pressing elements 13 to engage respective radial indentations 25 having an axial extension and thus serve as said end-of-stroke elements in an axial sliding movement of said second pressing elements 13 from and towards the base 31.

Figure 10:
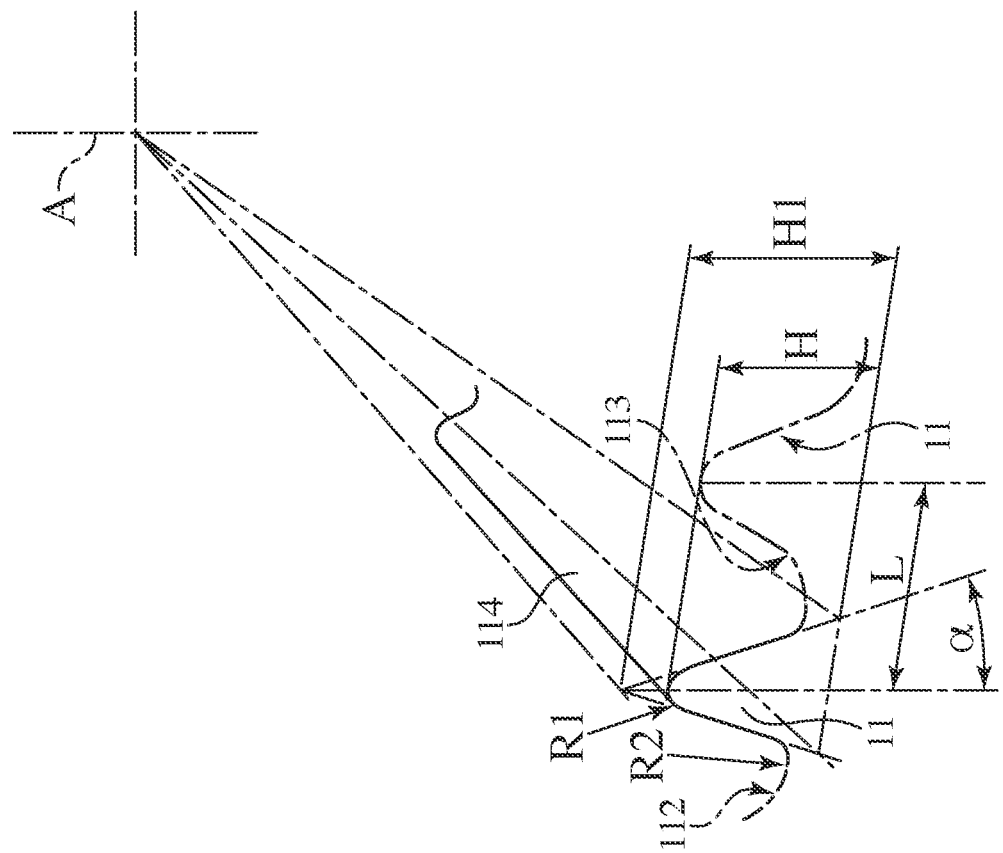
FIG. 10 schematically shows the theoretical geometry of the profile of the teeth which can be obtained by means of the equipment of FIG. 1.

The engraving heads 20 of the second pressing elements 13 are each provided axially overhanging towards the base 31 with a respective wedge-shaped knife 36 (FIGS. 5 and 8), circumferentially presenting a profile complementary to that of the front toothing 5 to be obtained and configured so that each knife 36, when pushed against the collar 10, forms on the inner ring 3 the flank profile 113 (FIG. 10) of each of two adjacent teeth 11 of the front toothing 5 to be obtained.

Between each pair of teeth 11 there is a groove 112 delimited by the flanks 113 of the adjacent teeth 11 and each tooth 11 has a tip or crest 114.

The knives 36 are configured to obtain rounded crests 114, having a radius of curvature R1 and grooves 112, also rounded and having a radius of curvature R2 different to R1 and, preferably, less than R1.

An almost perfectly rounded crest 114 is obtained, by virtue of the invention, in particular owing to the fact that the individual engraving teeth of the prior art are each subdivided into a pair of separate, independent pressing elements, arranged axially in sequence, such as the pressing elements 12 and 13, making it possible to have continuous guided deformation between respective faces 37 of the opposite flanks of the knives 36, such continuity not being obtainable in the prior art because the engraving teeth or the knives, for mounting reasons, must be circumferentially spaced apart.

The presence of the heads 23, also arranged in close circumferential contact, substantially without play, makes it possible to obtain a practically continuous annular work surface for the head 24 rotating in orbital motion, preventing, in particular, any lateral thrusts on the pressing elements 12, 13 owing to the action of the head 24.

According to one aspect of the application, the knives 36 are also configured so as to obtain teeth 11 in which R2 is preferably between 0.5 and 0.8 mm and in which the ratio between the theoretical height of the teeth 11 H1 (FIG. 10)—without the sliding by plastic deformation of the collar 10 which takes the actual height of the teeth to the value H—and the radius R1 of the crests 114 is always below 5 (i.e. H1/R1<5) wherein R1 is preferably greater than or equal to 1 mm.

Lastly, as the teeth 11 are wedge shaped, they have a height decreasing and a distance L between the bottoms of two contiguous teeth 11 also decreasing in the direction moving radially towards the axis A.

The knives 36 are thus configured to obtain preferably, for any radial distance from the axis A, a ratio H1/L of less than 0.866.

Figure 9:
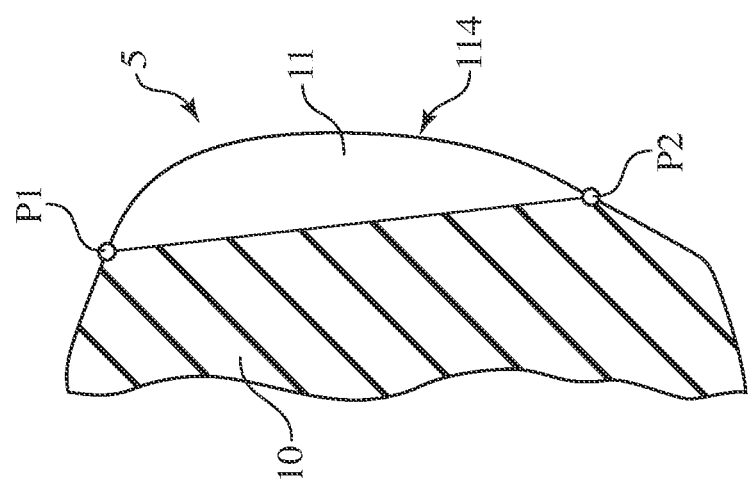
FIG. 9 schematically shows, on an enlarged scale, the longitudinal (axial) profile of a tooth of a toothing shown in radial section, which can be obtained by means of the equipment of FIG. 1.

With reference to FIG. 9, the profile of the crests 114 of the teeth 11 is such that there is no corner point between the two points P1 and P2 and such that the curvature is always greater than 1 mm between the two points P1 and P2.

The advantages of the invention are clear from the above.

It is also clear that the application further relates to a method for forming by plastic deformation a front toothing 5 on an inner ring 3 of a wheel hub 1, comprising the steps of:

forming (in a known manner, preferably by orbital forming) on one end of the inner ring 3 of the wheel hub 1 an upset annular collar 10;

plastically deforming the collar 10 in order to realize, frontally on the same, the frontal toothing 5 impressing axially and sequentially on the collar 10 a plurality of pressing elements; including the steps of:

i)—providing first pressing elements 12 carried axially sliding by a first plate 16 and second pressing elements 13 carried axially sliding by a second plate 18 coupled frontally to the first plate 16, respective first ends 14 of the first pressing elements 12 cooperating in contact and head to head with second ends 15 of the second pressing elements 13 arranged on the side opposite to the collar 10;

ii)—obtaining on each second pressing element 13 an engraving head 20 provided on the side opposite to the second end 15 with a respective wedge-shaped knife 36, circumferentially presenting a profile complementary to that of the front toothing 5 to be obtained;

iii)—pressing by means of a rotating head 24 in orbital motion respective hammer heads 23 of the first pressing elements 12 to push the first pressing elements 12 against the second pressing elements 13 and consequently, selectively and in sequence, each knife 36 against the collar 10, in which each knife 36 is configured to form, when pushed against the collar 10, the flank profile 113 of two adjacent teeth 11 of the front toothing 5 to be obtained; and v)—during phase iii) guiding the first and second pressing elements 12,13 so that the first pressing elements 12 are angularly spaced while the hammer heads 23 of the same are always kept in circumferential contact with each other, substantially without play, and so that the second pressing elements 13 are angularly spaced while the engraving heads 20 of the same are always kept in circumferential contact with each other, substantially without play.

Furthermore, in the method according to the application, the wheel hub 1, during the impression phase of the knives 36 against the collar 10, is supported locked axially and radially with respect to its own axis A of symmetry on a base 31 arranged facing to the second plate 18; moreover, the second pressing elements 13 are kept bound to the second plate 18 by means of axial end-of-stroke elements 28 that cooperate with respective radial indentations 25 radially obtained on the outside in correspondence with the second ends 15.

All of the aims of the application are thus achieved.

The aim of the present invention is therefore to provide equipment and an associated method for forming by plastic deformation a front toothing on an inner ring of a wheel hub, offering an alternative to prior art equipment and methods and, in particular, capable of combining the advantages of the two known forming systems described above without suffering from their disadvantages, thereby affording both greater precision in terms of the dimensions of the teeth and highly constant dimensions and geometry in the profile of the teeth, in particular their crests. The invention therefore provides innovative equipment and an associated method for forming by plastic deformation a front toothing on an inner ring of a wheel hub, as defined in the attached claims.

In addition to the embodiments of the application as described above, it is to be understood that there are numerous other variants. It is also to be understood that these embodiments are provided solely by way of example and do not limit the object of the application or its possible configurations. On the contrary, although the description given above enables a person skilled in the art to implement the present application according to at least one example of its embodiment, it is to be understood that numerous variations of the components described are possible without departure from the object of the application as defined in the appended claims, which are interpreted literally and/or according to their legal equivalents.

The invention claimed is:

1. An apparatus for forming by plastic deformation a front toothing on an inner ring of a wheel hub, in which the inner ring is provided at one end with an annular collar; the apparatus comprising:
   a plate support having an axis of symmetry (B) and a base configured to support the wheel hub coaxial with the axis of symmetry (B) of the plate support, the plate support being axially mobile relatively to the base so as to cooperate in use, frontally, with the annular collar;
   a plurality of first and second blade-shaped pressing elements arranged in a crown symmetrically around the axis of symmetry (B) so that a first end of each first pressing element facing towards the base cooperates frontally in contact with a second end of a corresponding second pressing element facing opposite the base;
   a first plate which supports axially passing through the first pressing elements;
   a second plate coupled frontally to the first plate and axially bound to it, the second plate supporting axially passing through the second pressing elements, the second plate being arranged on the side of the base and the first and second plate being supported by the plate support;
   the second pressing elements being slidingly housed in respective first axial slits obtained radially in the crown through the second plate, circumferentially spaced between each other, and being each provided, on the side opposite to the second ends and towards the base, of an engraving head circumferentially wider than the first slits, configured so that the engraving heads of the second pressing elements cooperate circumferentially without play in contact with each other and in a sliding way.

2. The apparatus of claim 1, wherein the first pressing elements are slidingly housed in respective second axial slits obtained radially in the crown through the first plate, circumferentially spaced between each other, and are provided each, on the side opposite to the first end, of a hammerhead circumferentially wider than the second slits, configured so that the hammerheads of the first pressing elements cooperate circumferentially without play in contact with each other and in a sliding way.

3. The apparatus of claim 2, wherein the apparatus further comprises a rotating in orbital motion pressure head, the hammer heads being configured to cooperate in use with the pressure head to push one at a time the first pressing elements against the second pressing elements with a sequential axial movement and push accordingly, selectively and with a corresponding sequential axial movement, each second pressing element towards the base and, in use, against the collar to engrave on the collar the said front toothing.

4. The apparatus of claim 3, wherein the second ends of the second pressing elements are provided radially on the outside with respective radial indentations that extend axially for a prefixed length (T) delimiting on each second pressing element a first and a second shouldering face, which are opposite and facing each other.

5. The apparatus of claim 4, further comprising a plurality of end-stoke elements configured to engage said indentations and cooperate with the first and second shouldering face of each indentation to limit the axial movement of each second pressing element to said fixed length.

6. The apparatus of claim 5, further comprising a third plate arranged radially on the outside of the second plate; a first annular end of the third plate being placed immediately adjacent to the first plate and axially overhanging with respect to the second plate so as to form between the first and the second plate an annular seat arranged in correspondence of the second ends of the second pressing elements, the second ends protruding at least in part axially overhanging with respect to the first slits on the side of the first plate.

7. The apparatus of claim 6, wherein the third plate is arranged axially tight packed between the first and the second plate; said annular seat housing at least a pair of semi-rings configured to protrude radially overhanging from the second plate and towards the second pressing elements to engage respective radial indentations having an axial extension of the second pressing elements and serve as end-of-stroke elements in an axial sliding movement of said second pressing elements to and from the base.

8. The apparatus of claim 7, wherein the engraving heads of the second pressing elements are provided axially overhanging towards the base each one of a respective wedge-shaped knife, circumferentially presenting a profile complementary to that of the front toothing to be obtained and configured so that each knife, when pushed against the collar, forms on the inner ring the flank profile of two adjacent teeth of the front toothing to be obtained.

9. A method for forming by plastic deformation a front toothing on an inner ring of a wheel hub, comprising:
   forming on one end of the inner ring of the wheel hub an upset annular collar;
   plastically deforming the collar in order to realize, frontally on the same, the frontal toothing impressing axially and sequentially on the collar a plurality of pressing elements;
   providing first pressing elements carried axially sliding by a first plate and second pressing elements carried axially sliding by a second plate coupled frontally to the first plate, respective first ends of the first pressing elements cooperating in contact and head to head with second ends of the second pressing elements arranged on the side opposite to the collar;
   obtaining on each second pressing element an engraving head provided on the side opposite to the second end with a respective wedge-shaped knife, circumferentially presenting a profile complementary to that of the front toothing to be obtained;
   pressing by means of a rotating head in orbital motion respective hammer heads of the first pressing elements to push the first pressing elements against the second pressing elements and consequently, selectively and in sequence, each knife against the collar;

each knife being configured to form, when pushed against the collar, the flank profile of two adjacent teeth of the front toothing to be obtained;

during pressing by means of a rotating head, guiding the first and second pressing elements so that the first pressing elements are angularly spaced while the hammer heads of the same are always kept in circumferential contact with each other, substantially without play, and so that the second pressing elements are angularly spaced while the engraving heads of the same are always kept in circumferential contact with each other, substantially without play.

10. The method of claim 9, wherein the wheel hub, during the impression of the knives against the collar, is supported locked axially and radially with respect to its own axis (A) of symmetry on a base arranged facing to the second plate; and wherein the second pressing elements are kept bound to the second plate by means of axial end-of-stroke elements that cooperate with respective radial indentations of the second pressing elements radially obtained on the outside thereof in correspondence of the second ends.

\* \* \* \* \*